United States Patent Office 3,034,595
Patented May 15, 1962

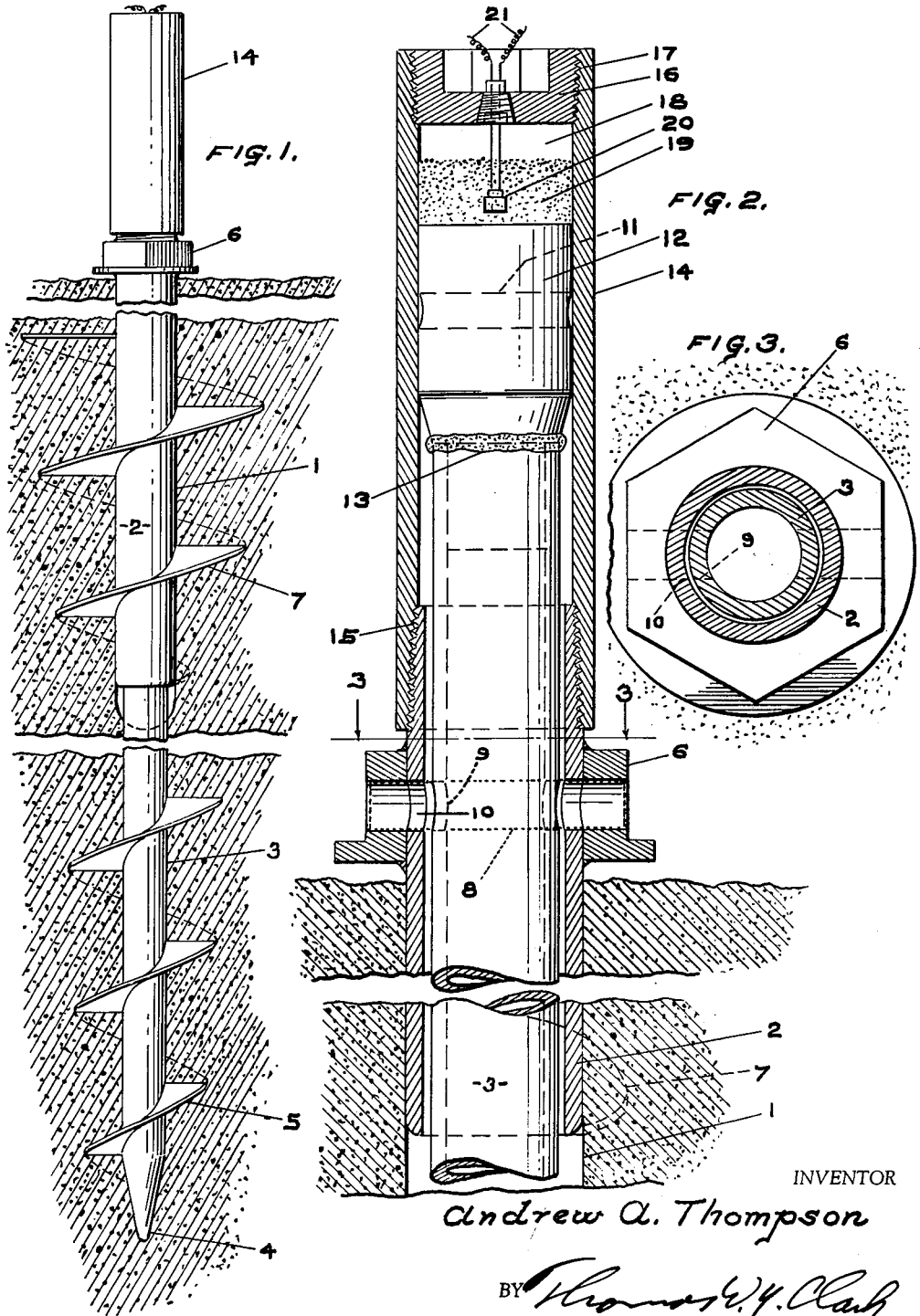

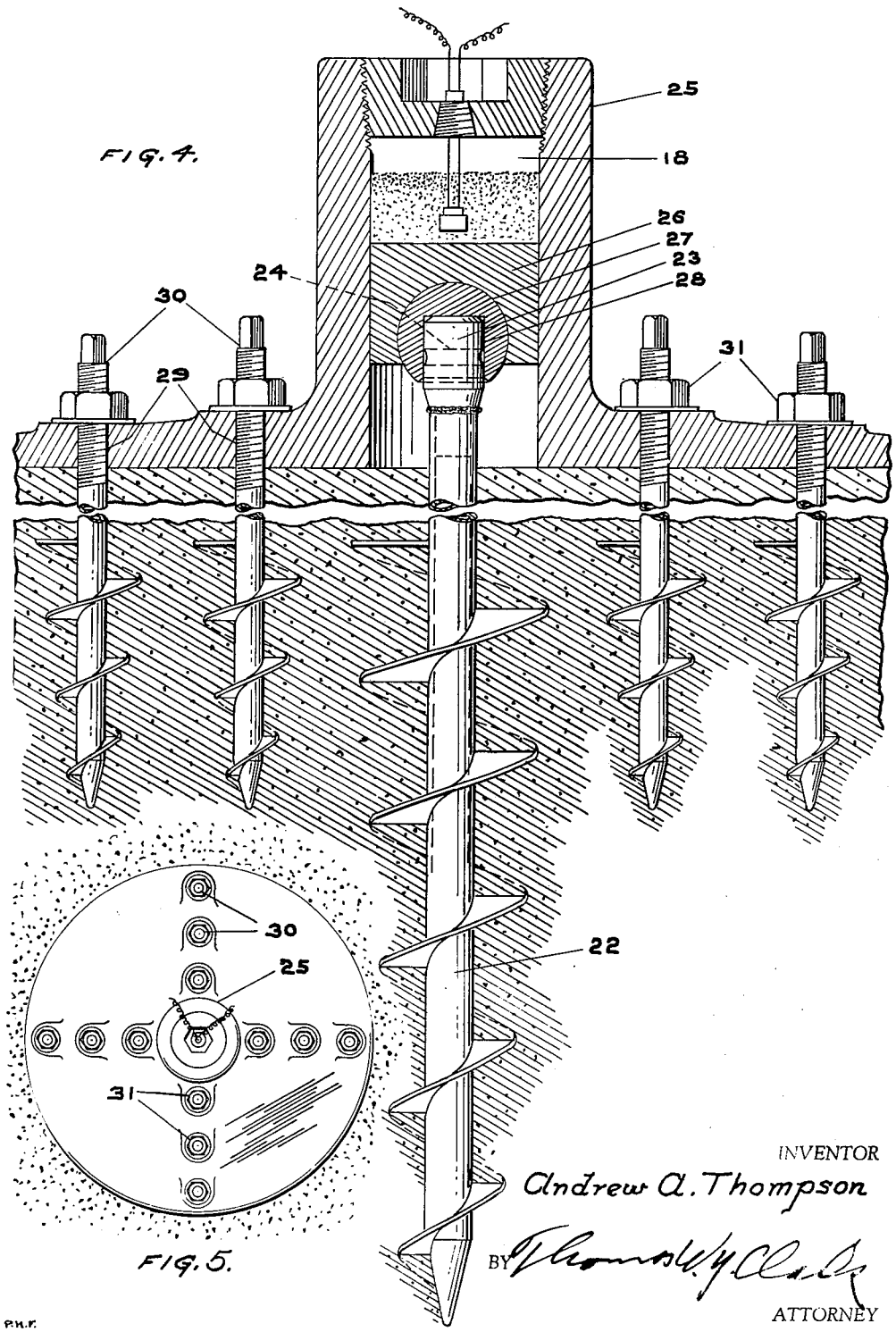

3,034,595
APPARATUS FOR SEISMIC SURVEYING
Andrew A. Thompson, Aberdeen, Md.
Filed Feb. 27, 1959, Ser. No. 796,069
8 Claims. (Cl. 181—.5)

This invention relates to a method and apparatus for generating waves of a controlled frequency in earth, rock or water for oil, mining and engineering surveys.

One object of the invention is the efficient generation of a seismic signal for reflection and refraction surveys with a strong pulse in a desired frequency spectrum with a greater ratio of signal to noise than is possible with other apparatus and methods heretofore used. Although a usual method of generating such waves is the use of an explosive in a shot hole, this releases a large unit of energy but the method produces unwanted noise and the frequency spectrum is difficult to control. In the shot hole method, a large force is applied over too short a time to a too small portion of the material and less than 1% of the explosive energy is realized in useful frequency waves. Over 99% of the energy is used to break up and compress the material around the explosive and to produce high frequency waves that rapidly fade out because of solid friction losses, viscous losses, plastic losses, scattering, early reflection and early refraction and in the production of unwanted noise. The energy used in this manner is not going to the production of a useful seismic pulse that can be used in subsurface mapping, but often increases the seismic noise level when the reflections or refractions are returning from their horizons. Thus the signal to noise level is lowered to reduce the value of the record.

Some other methods involve the use of equipment too large for practical field use. Some methods involve large and controlled energy deliveries distributed to the earth surface but the reaction or recoil is against a mass of so much lighter resistance than the earth that most of the energy goes into the smaller mass, so that the method loses its effectiveness.

In the method of the instant invention through sufficient coupling, both action and reaction are delivered largely to the earth in which sufficient mass is available. Also the seismic wave may be generated below the weathered or surface layer of the earth by coupling the device to the earth in a vertically drilled hole. Another advantage of the instant invention is that directionality can be given to the seismic propagation of the waves by moving a large enough portion of the medium in the desired direction. More than one device may be needed to provide the best directionality. A much greater portion of the medium can be moved with a minimum of plastic deformation to produce the wave than could be moved either in a shot hole or by creating an impact upon the surface of the ground. The efficient generation of the waves in the desired frequency and direction lessens the creation of secondary and unwanted waves. Also the manner of connecting the charge chamber and piston to the ground tends to maintain the relatively moving parts in alignment.

Another object of the invention is to efficiently deliver a large force over the desired short time interval to a relatively large part of the medium where the wave is to be generated so that failure or rupture of the material remains as small as possible.

Another object of the invention is to generate transverse waves which will be propagated at right angles to the direction of the compressional wave propagation. To date transverse waves are hardly ever used in seismic prospecting since they can not be separated from the faster moving compressional waves commonly used.

In this invention a large chamber as in a gun in which an explosive is detonated to drive a long rod or piston is coupled to the medium or earth along its length and the rod or piston is likewise similarly connected to a comparable amount of the earth or other medium. Upon detonation of the charge a seismic wave would be generated in the earth. Other means of exciting a shock between the members could be utilized.

There are other objects and advantages of the invention that will be apparent from the following description and the accompanying drawings forming a part hereof and in which:

FIGURE 1 is an elevational view of an apparatus embodying the invention, sunk into the earth.

FIGURE 2 is a longitudinal sectional view of a part of the apparatus.

FIGURE 3 is a horizontal sectional view on line 3—3 of FIGURE 2.

FIGURE 4 is a vertical partial sectional view of a modified form of the apparatus.

FIGURE 5 is a top plan view of the apparatus of FIGURE 4.

In the apparatus shown, a hole 1 is preferably drilled into the earth of a depth and diameter slightly exceeding the dimensions of the tube 2 and this preferably extends below the surface or weathered layer of the earth in the locality where it is used, so that the apparatus may have firm earth in which to set up the wave vibrations. If the earth be quite hard at this location a further smaller hole is drilled of substantially the length and diameter of the rod or piston 3. If the earth be less solid, the piston could be screwed through the initial opening 1. The piston 3 is preferably pointed as at 4 and has thereon screw threads 5 to hold it in the earth and to obtain a firm hold upon the earth. Tube 2 has a hex collar 6 welded thereto, and it likewise has threads 7 thereon which are somewhat larger in diameter and of the same pitch as threads 5, and it may be placed over piston 3 and secured fast to piston 3 by a strong pin 8, shown in fine dotted lines in FIGURE 2, passing through aligned openings 9 and 10 in the piston and the tube and nut respectively. Both the piston and the tube as a unit can then be screwed into the earth to the desired depth by a drill rig which could be attached to the tubular member 2 by connecting with the nut 6 or both the piston and tube as a unit can be turned into the earth by means of a bar, not shown, passing through the opening 11 in the head 12 welded in the piston 3 as at 13 and forming the top of the piston 3. The pin 8 attaching tubular member 2 rigidly to the piston 3 must be removed after these members are coupled to the earth and before the explosive is detonated as explained below.

In the alternative, the members could be placed separately, after sinking the piston 3 to the desired depth in the solid earth, below the weathered layer if possible, the tube 2 is placed over the piston and likewise screwed below the surface layer of the earth by a drill rig which could be attached to the tubular member 2 by connecting with the collar 6. The piston 3 could initially be turned into the earth by means of a bar, not shown, passing through the opening 11 in the head 12 attached to the piston 3.

The head 12 of the piston closely fits a sleeve 14 attachable to the tubular member 2 by means of screw threads 15. A cap 16 is likewise attached to the sleeve 14 by means of screw threads 17, forming a combustion chamber 18 between the cap and piston head 12 and consequently between the tubular member 2 and the piston 3. The explosive charge 19 may be placed in the combustion chamber 18 and a detonator 20 is placed within the explosive charge and it has electric wires 21 leading there-from which may be energized by a source of current and closed by a switch not shown. It will therefore be apparent that upon the detonation of the explosive, compressional waves will be set up in the earth in a general direction lengthwise of the piston and tube and that the threads on them, threaded into the earth, will aid in maintaining their alignment. It will also be apparent that making the pitch of the threads on the piston and tube the same avoids fracture of the earth in the passage of the threads on the piston through the space later used by the tube threads to hold the tube firmly in the earth. During the insertion of the piston and tube, the distance between the bottom of threads 7 and the top of threads 5 must be fixed so that threads 7 will follow in, and slightly enlarge, the thread path cut in the earth by threads 5. It will also be apparent that it is desirable to have the piston and tube long enough so that the tops of both extend above the surface of the earth.

In the modified forms of FIGURES 4 and 5, a similar threaded piston 22 is used having a head 23 welded thereto and which is screwed into the ground by a drill rig or by a bar, not shown, through opening 24 in the head.

A heavy round metal cap or hat 25 having a similar chamber 18 therein fits over a fitted member 26 therein which has a ball 27 therein to form a ball and socket joint. The ball has a tubular opening 28 in its under side to receive therein the head 23 of piston 22. The ball and socket joint allows for slight angularity between the hat 25 and piston 22. The hat has openings 29 in its brim for radially spaced earth screws 30 screwed into the ground and holding the hat by nuts 31 on top of the earth screws. It will be apparent that a firm hold of a large portion of the earth can be obtained by this modification. The firing of the explosive in this modification is identical to that previously described.

By connecting the member 2 or 25 to a larger proportion of the earth and including the weight or mass of the member in the calculations, the transverse waves, always propagated, will become more distinct and can be utilized for seismic studies.

The amount of the charge and the type of the explosive will control the force and force duration distributed to the medium, and thus the amplitude and length of the waves generated and propagated in the earth.

In water the method of coupling the chamber or tube and the piston could be simplified and still accomplish the objective of having both chamber and piston move a large mass of the medium.

It is desirable that the distance between the areas of the coupling of the charge chamber and of the piston should be about one-half a wave length apart, since the medium is moved in opposite directions and one-half the wave length distance would keep the rarefaction part of the wave from destroying the compressional part of the wave. The usual travelling compressional wave has the negative phase at about a half wave length behind the positive pressure phase.

By this invention the stretching of the medium at one half wave length from where the medium is being compressed is most important in the seismic wave generation, as the resulting strong negative phase that is generated just below the top anchor point, or top screw, follows the compressional part of the wave, travelling vertically downwardly, to give the desired complete wave form, and this increases the wave strength and gives sufficient definition and control to the period.

Not only do both forces coupled to the earth have enough resistance to push against for their reaction in the opposite direction, but a positive and negative stress field is produced with the desired shape and length. For example, if it be assumed that the earth in the vicinity of the surface has a propagation velocity of 1000 feet per second, and that the firing chamber in the modification of FIGURE 4 will detonate with a speed so that the resulting applied force to the medium will increase from zero to maximum in five milliseconds: then if it be assumed that the screws 30 holding the hat in the modification of FIGURE 4 penetrate into the earth a distance of 5 feet and if the threads of the screw 22 in this figure are assumed to be on a shaft having a threadless stem 10 feet long, then the shaft has thereon threads for 5 feet below the threadless stem, so that the shaft extends into the earth 10 feet before the threads begin and then the threads continue on the shaft for a depth of 5 feet, the total wave length will then be 20 feet, and a half of a wave length will be 10 feet from the surface of the earth five milliseconds after detonation when the maximum force is applied by the device, in opposite directions at the two positions in the medium. Also it will be apparent that the top of the screw on the shaft 22 will then be one-half a wave length from the surface of the earth and the bottom of the screw on this shaft will be one-half a wave length from the bottom of the screws attaching the hat to the earth. On this assumption of perfection, the rarefications of the wave will reinforce the period and strengthen the seismic wave that is generated.

As well as controlling wave frequency by using explosives of a desired burning rate, the dimensions of the device and the direction of the moving piston could be altered, also the weight of the piston and tube and piston and hat will play a definite part in the generation of waves of the desired frequency, amplitude, and type.

It will be apparent that many modifications of the apparatus can be made within the scope of the invention as defined in the claims.

What is claimed as new and is desired to be secured by Letters Patent is:

1. Apparatus for generating waves in a medium comprising a pair of members movable relative to each other and closely spaced opposite each other in axial alignment, said members having a shock exciting means therebetween, means connected to the shock exciting means to release the energy thereof and means to connect the respective members to spaced portions of the medium to constrain the members to move axially upon the release of the said energy to set up, in the spaced portions of the medium, waves with a particle motion in line with the axis of the members.

2. Apparatus for generating seismic waves for use in seismic geophysical prospecting comprising a pair of members movable relative to each other and closely spaced opposite to each other in axial alignment, said members having a shock exciting means therebetween, means connected to the shock exciting means to release the energy thereof and means to connect the respective members to spaced portions of the earth to constrain the members to move axially upon the release of said energy to set up, in the spaced portions of the earth, waves with a particle motion in line with the axis of the members.

3. Apparatus for generating waves in a medium for use in investigating properties of the medium comprising a pair of members movable relative to each other, spaced opposite each other in axial alignment, one member having an orifice to receive therein a part of the other of said members to maintain their alignment in relative movement, said members having a shock exciting means therebetween, means connected to the shock exciting means to release the energy thereof and means to connect the respective members to spaced portions of the medium to constrain the members to move axially upon the release of said energy to set up, in the spaced portions of the medium, waves with a particle motion in line with the axis of the members.

4. Apparatus for generating waves in a medium for use in investigating properties of the medium comprising a pair of members closely arranged in axial alignment and movable relative to each other, one having a tubular portion telescoping over the other, inner member to maintain the alignment of the members in relative movement, said members having a shock exciting means therebetween, means connected to the shock exciting means to release the energy thereof and means to connect the respective members to spaced portions of the medium, the connecting means for the inner member of the pair being at the center of the connecting means for the other to constrain the members to move axially upon the release of said energy to set up, in the spaced portions of the medium, waves with a particle motion in line with the axis of the members.

5. Apparatus for generating seismic waves in the earth for use in seismic geophysical prospecting comprising a pair of members arranged in axial alignment and movable relative to each other, one member being a piston extending into the earth, the other being a capped tubular member partly enclosing the piston to maintain the alignment of the members in relative movement, the capped tubular member having a shock exciting means therein, means connected to the shock exciting means to release the energy thereof, the members being moved relative to each other upon the release of said energy, and means to connect the respective members to spaced portions of the earth to constrain the members to move axially upon the release of said energy to set up, in the spaced portions of the earth, waves with a particle motion in line with the axis of the members.

6. Apparatus for generating seismic waves in the earth for use in seismic geophysical prospecting comprising a pair of members arranged in axial alignment and movable relative to each other, one member being a piston extending into the earth, the other being a capped tubular member partly enclosing the piston to maintain the alignment of the members in relative movement, the capped tubular member having a shock exciting means therein, means connected to the shock exciting means to release the energy thereof, the members being moved relative to each other upon said release of energy, threads on the respective members to connect them to spaced portions of the earth to constrain the members to move axially upon the release of said energy to set up, in the spaced portions of the earth, waves with a particle motion in line with the axis of the members, the threads on the members being of the same pitch to minimize disturbance of the earth upon threading the piston member thereinto for the following threaded tubular member.

7. Apparatus for generating seismic waves in the earth for use in seismic geophysical prospecting comprising a pair of members arranged in alignment and movable relative to each other, one member being a piston extending into the earth, the other being a heavy cap-like member to be connected to the surface of the earth partly enclosing the piston to maintain the alignment of the members in relative movement, the cap-like member having a shock exciting means therein, means connected to the shock exciting means to release the energy thereof, the members being moved relative to each other upon said release of energy and means to connect the respective members to spaced portions of the earth to constrain the members to move apart upon release of the energy to set up, in the spaced portions of the earth, waves with a particle motion in line with the axis of the piston.

8. Apparatus for generating seismic waves in the earth for use in seismic prospecting comprising a pair of members arranged in axial alignment and movable relative to each other, one member being a piston extending into the earth, the other being a heavy metal hat having a brim and partly enclosing the piston to maintain the alignment of the members in relative movement, the metal hat having a shock exciting means therein, means connected to the hat brim to screw the hat to the surface of the earth, means connected to the shock exciting means to release the energy thereof, the members being moved relative to each other upon said release of energy, threads on the piston to connect it to a portion of the earth below the surface and spaced from the hat screw means to constrain the piston to move axially upon the release of said energy, to set up, in the spaced portions of the earth, waves with a particle motion in line with the axis of the piston.

References Cited in the file of this patent

UNITED STATES PATENTS

| | | |
|---|---|---|
| 2,203,140 | Green | June 4, 1940 |
| 2,614,804 | Carlisle | Oct. 21, 1952 |
| 2,760,591 | White et al. | Aug. 28, 1956 |

FOREIGN PATENTS

| | | |
|---|---|---|
| 16,288 | Great Britain | A.D. 1911 |